(12) United States Patent
Aurand et al.

(10) Patent No.: US 11,912,254 B2
(45) Date of Patent: Feb. 27, 2024

(54) METHOD AND DEVICE FOR AUTOMATICALLY EMERGENCY STOPPING

(71) Applicant: DAIMLER TRUCK AG, Leinfelden-Echterdingen (DE)

(72) Inventors: Tobias Aurand, Ludwigsburg (DE); Markus Zimmer, Leinfelden-Echterdingen (DE); Regina Hartfiel, Darmstadt (DE)

(73) Assignee: DAIMLER TRUCK AG, Leinfelden-Echterdingen (DE)

( * ) Notice: Subject to any disclaimer, the term of this patent is extended or adjusted under 35 U.S.C. 154(b) by 311 days.

(21) Appl. No.: 17/604,065

(22) PCT Filed: Mar. 17, 2020

(86) PCT No.: PCT/EP2020/057253
§ 371 (c)(1),
(2) Date: Oct. 15, 2021

(87) PCT Pub. No.: WO2020/212048
PCT Pub. Date: Oct. 22, 2020

(65) Prior Publication Data
US 2022/0203942 A1 Jun. 30, 2022

(30) Foreign Application Priority Data
Apr. 16, 2019 (DE) .................. 10 2019 002 787.6

(51) Int. Cl.
*B60T 7/12* (2006.01)
(52) U.S. Cl.
CPC ............. *B60T 7/12* (2013.01); *B60T 2230/04* (2013.01); *B60T 2250/00* (2013.01)
(58) Field of Classification Search
CPC ..... B60T 7/12; B60T 2230/04; B60T 2250/00
(Continued)

(56) References Cited

U.S. PATENT DOCUMENTS 7,016,783 B2 * 3/2006 Hac ................. B60W 30/09
303/146
8,935,071 B2 * 1/2015 Lee .................... B60T 8/17557
303/193
(Continued)

FOREIGN PATENT DOCUMENTS

DE 3016081 A1 12/1981
DE 10258617 A1 * 4/2004 ............... B60Q 1/44
(Continued)

OTHER PUBLICATIONS

International Search Report dated Sep. 15, 2020 in related/corresponding International Application No. PCT/EP2020/057253.
(Continued)

*Primary Examiner* — Atul Trivedi
(74) *Attorney, Agent, or Firm* — PATENT PORTFOLIO BUILDERS PLLC

(57) ABSTRACT

A method for automatically emergency stopping a motor vehicle from a starting speed to a standstill by a braking device of the motor vehicle is provided. The braking device is actuated to carry out a delay profile with at least two delay phases. During a delay increase phase the delay until a threshold delay is increased and during a delay decrease phase, lasting until standstill, the delay is reduced to zero. The temporal courses of the delay are determined during the delay increase and the delay decrease at least sectionally as nth degree polynomials, where n>0, depending on the starting speed, in such a way that a stopping duration, which represents a time duration necessary for emergency stopping, does not fall below a predetermined minimum stopping duration and a distance covered during the stopping duration does not exceed a predetermined maximum stopping distance.

10 Claims, 6 Drawing Sheets

Figure 1:
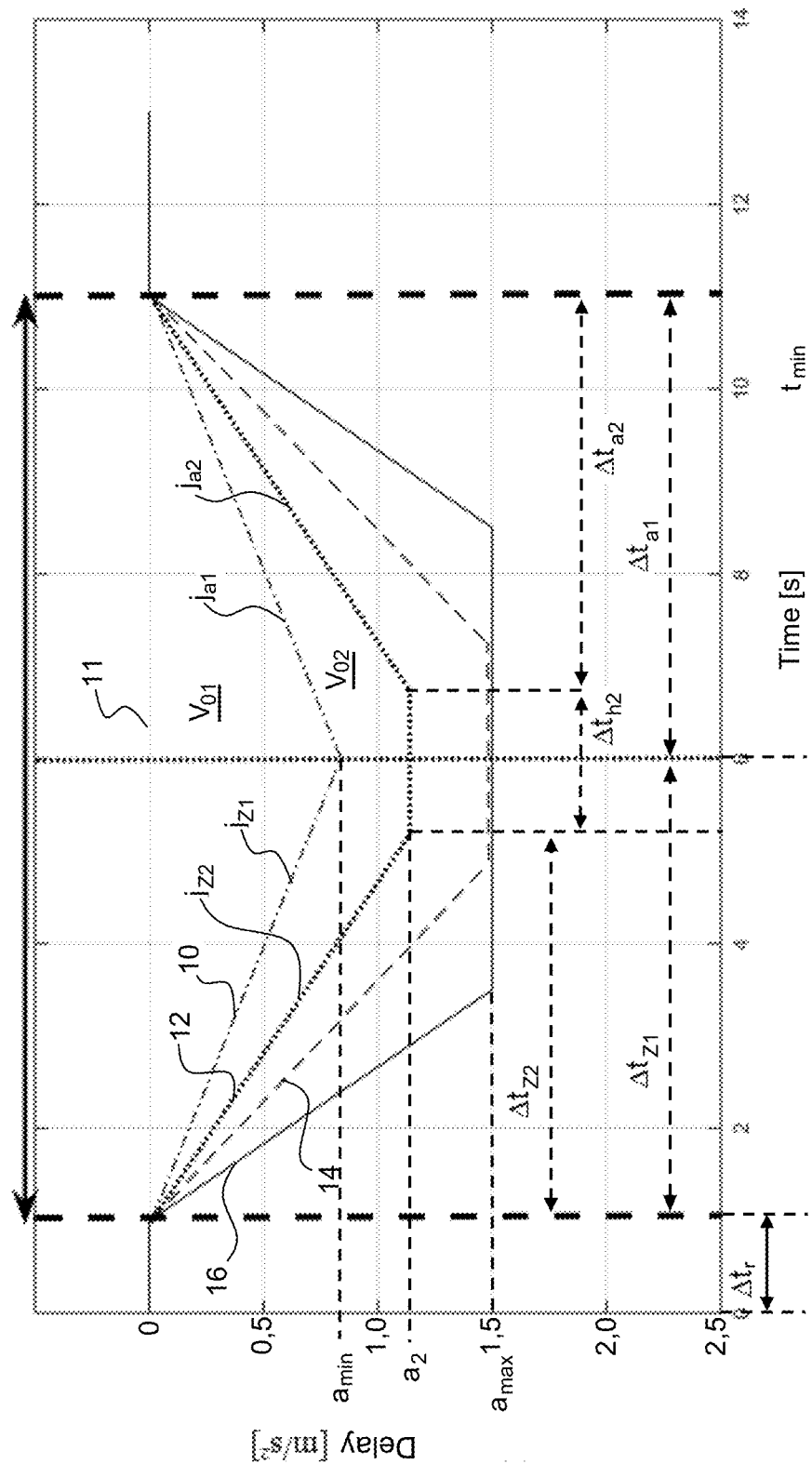

(58) Field of Classification Search
USPC .......................................................... 701/70
See application file for complete search history.

(56) References Cited

U.S. PATENT DOCUMENTS

| | | | |
|---|---|---|---|
| 10,471,938 B2 | 11/2019 | Das et al. | |
| 11,077,845 B2 * | 8/2021 | Shalev-Shwartz | ........................... B60W 50/0097 |
| 2001/0003402 A1 * | 6/2001 | Isono | ...................... B60T 13/72 303/155 |
| 2003/0218379 A1 * | 11/2003 | Miyazaki | ............ B60T 8/17636 303/150 |
| 2006/0220908 A1 * | 10/2006 | Petersen | ............... B60T 8/3275 701/70 |
| 2015/0066323 A1 | 3/2015 | Ouchi | |
| 2017/0205831 A1 | 7/2017 | Shin et al. | |
| 2018/0194334 A1 * | 7/2018 | Masuda | .................. B60T 8/172 |
| 2018/0314267 A1 * | 11/2018 | Switkes | ................ G05D 1/0297 |
| 2019/0085924 A1 * | 3/2019 | Kirby | .................... G01D 11/16 |
| 2020/0117206 A1 * | 4/2020 | Egnor | ....................... B60T 7/22 |
| 2020/0231153 A1 * | 7/2020 | Yokota | ................... B60T 7/122 |
| 2022/0135039 A1 * | 5/2022 | Jardine | ........... B60W 30/18159 701/26 |
| 2023/0007902 A1 * | 1/2023 | Muthusami | ............. B61L 27/20 |

FOREIGN PATENT DOCUMENTS

| | | | | |
|---|---|---|---|---|
| DE | 102005054064 A1 | | 5/2007 | |
| DE | 102005054754 A1 | | 5/2007 | |
| DE | 102011109842 A1 | | 2/2013 | |
| DE | 102015015097 A1 | | 5/2016 | |
| DE | 112014005045 T5 | | 8/2016 | |
| DE | 102015205673 A1 | | 10/2016 | |
| DE | 102015218166 A1 | | 3/2017 | |
| DE | 102016204136 A1 | | 9/2017 | |
| DE | 102016222172 B3 * | | 5/2018 | .............. B60T 13/74 |
| DE | 102016224157 A1 | | 6/2018 | |
| DE | 102019101443 A1 * | | 7/2020 | ................ B60T 7/12 |
| EP | 2407358 A1 | | 1/2012 | |
| FR | 2929909 A1 * | | 10/2009 | ............ B60T 13/662 |
| FR | 3070655 A1 * | | 3/2019 | ................ B60T 7/22 |
| GB | 2511748 A * | | 9/2014 | ................ B60T 7/22 |
| GB | 2579024 A * | | 6/2020 | ............ B60Q 1/085 |
| RU | 2604369 C2 * | | 12/2016 | ........... B60R 21/013 |
| WO | WO-2018110603 A1 * | | 6/2018 | ................ B60T 7/12 |
| WO | WO-2020212048 A1 * | | 10/2020 | ................ B60T 7/12 |

OTHER PUBLICATIONS

Office Action dated Aug. 20, 2020 in related/corresponding DE Application No. 10 2019 002 787.6.
Written Opinion dated Sep. 15, 2020 in related/corresponding International Application No. PCT/EP2020/057253.

* cited by examiner

METHOD AND DEVICE FOR AUTOMATICALLY EMERGENCY STOPPING

BACKGROUND AND SUMMARY OF THE INVENTION

Exemplary embodiments of the invention relate to a method for automatically emergency stopping a motor vehicle from a starting speed to a standstill, as well as to a device for carrying out such an emergency stopping method and a motor vehicle equipped with such a device.

When using driver assistance systems, an automatic braking function of the vehicle is triggered when different conditions emerge. Thus, with individual driver assistance systems during an automatic driving operation, it is checked by a so-called "hands-on" driver controller as to whether the driver has at least one hand on the steering wheel and thus is always able to assume the driving task again in a controlled manner. If this condition is not fulfilled, the driver is first warned and requested to take over steering activity again. If this does not take place, an automatic function can be introduced after a certain period of time, in particular a method for carrying out an automatic emergency stop of a motor vehicle ("Emergency Stop Assist") can be implemented. This leads to the vehicle being decelerated in a controlled manner to a standstill according to a set delay curve.

When triggering a function that automatically decelerates the vehicle, a certain delay curve is predetermined and a corresponding delay request is implemented. When parametrizing the delay curve, aspects relevant to safety, such as following traffic, emerging possible loss of lane and other risks, have to be taken into consideration. Because of these, the stopping duration, which is necessary for the deceleration process, and the corresponding braking path are of great interest when designing the deceleration function.

An emergency stopping method is known from DE 10 2015 015 097 A1 in which a braking delay is increased again and again in several steps, for example for 5 s with 0.3 m/s$^2$, then for 10 s with 1.3 m/s$^2$, then to 3 m/s$^2$. Here, the triggering is carried out when a sensor system establishes the driving incompetency of the driver.

DE 11 2014 005 045 T5 and DE 10 2016 224 157 A1 disclose emergency stopping methods for motor vehicles when the driving incompetency of the driver without further information has been established in relation to the delay course of the respective emergency stopping method.

Exemplary embodiments of the invention are directed to an emergency stopping method and a device for carrying out the emergency stopping method, which enables a safe, automatic deceleration to a standstill for preferably all situations and sped ranges.

According to an embodiment, the braking device is actuated in order to carry out a delay profile consisting of at least two delay phases, wherein, during a delay increase phase, the delay is increased up to a threshold delay and, during a delay decrease phase lasting until a standstill, the delay is reduced to zero, wherein the temporal courses of the delay during the delay increase and the delay decrease are determined at least sectionally as nth degree polynomials, where n>0, depending on the starting speed (v0), in such a way that a stopping duration does not fall below a predetermined minimum stopping duration, and a distance covered during the stopping duration, also called the braking distance, does not exceed a predetermined maximum stopping distance. The stopping duration here represents a time duration necessary for the emergency stop, i.e., the time duration from the start of the actuation of the braking device to reaching a standstill.

In this way, on the one hand it can be achieved that the vehicle comes to a standstill at the earliest at the end of the minimum stopping duration, for example at the earliest after 10 s. The minimum stopping duration thus directly affects the maximum delay. This is advantageous because subsequent traffic participants thus have sufficient time available to recognize the deceleration of the decelerating vehicle in good time and to be able to react to it. The minimum stopping duration also gives the vehicle driver a sufficiently long amount of time to detect the situation and to adopt any necessary countermeasures, e.g., aborting the emergency stop, or to steer onto a possibly present hard shoulder. In doing so, it can be ensured that the driver is not surprised by the emergency stop process. On the other hand, it is achieved that the vehicle drives along a stretch of road until reaching the standstill, the stretch of road being no longer than the predetermined maximum stopping distance, for example no longer than 500 m. This is advantageous since too long a stopping distance, also called braking distance, could become a safety risk in situations in which the driver can no longer control the vehicle themselves, for example for health reasons.

In order to constantly achieve at least one determined minimum stopping duration, a delay request can be defined by two possibilities: on the one hand, a parametrization of the delay ramp increase is carried out. However, on the other hand, a parametrization of the maximum delay value (of the threshold delay) can also be set. Both possibilities can be used separately or also together in combination.

In this way, an optimum delay profile for the respective starting speed (that is the speed at which the emergency stopping method is triggered) can be defined, which observes the predetermined boundary conditions, namely both a minimum stopping duration and a maximum stopping duration. The delay profile breaks down into at least two delay phases, in which first the delay (negative acceleration) increases and then falls again. Here, the curve sections of the delay profile can be defined as nth degree polynomials, where n>0. In the simplest case (n=1), these are suitable a-t straight lines, i.e., in each case phases of constant jolts (temporal deviation of the acceleration). In this case, the a-t diagram looks like a (tilted) peaked roof. Alternatively, higher-degree polynomials can also be used, which approximate a sinusoidal half-wave, for example. If the starting speed does not exceed an upper threshold value, the boundary conditions are observed by determining a suitable jolt amount, which (preferably yet not necessarily) is identical for the delay increase phase and the delay decrease phase. However, if the starting speed is too great, the threshold delay (i.e., the delay emerging in the profile at the break point) would become inadmissibly high for the vehicle occupants when dividing into two delay phases. The delay profiles can also sectionally be made up of several nth degree polynomials, in particular of several straight line sections, in each case, wherein the parameters thereof are advantageously provided in a look-up table for access.

Thus, according to an advantageous development, a delay stopping phase passes between the delay increase phase and the delay decrease phase, in which the delay substantially corresponds to the threshold delay, in particular does not deviate from the threshold delay by more than a predetermined value, for example by no more than 20% of the threshold delay. In the simplest case, the delay remains constant during the delay stopping phase. In this case, an angular well shape emerges with two break points at the start and end of the delay stopping phase. In doing so, two further degrees of freedom emerge for setting the delay profile, namely the duration of the delay stopping phase and the size of the threshold delay. Thus, preferably yet not necessarily with constant jolt values in the increase and decrease phases, it can be decelerated either for a delay stopping phase lasting longer with a lower threshold delay or with a shorter delay stopping phase with a higher threshold delay. In the case mentioned first, the stopping distance is increased, which is not problematic as long as the maximum stopping distance is not exceeded.

According to an advantageous development of the invention, the threshold delay exceeds a function of the starting speed, which exceeds a minimum delay, so that the driver is aware that deceleration is occurring autonomously. The minimum delay can preferably be about 0.7 to 0.8 m/s$^2$. It is equally advantageous to set a maximum delay, preferably ranging from 1.2 m/s$^2$ to 1.8 m/s$^2$, in order to ensure that the vehicle occupants are not subjected to unnecessarily high braking accelerations.

However, if the starting speed is so high that, when observing the maximum delay in the delay stopping phase, the maximum stopping distance would be exceeded, it is necessary to increase the jolt values during the delay increase and decrease phases and/or to increase the threshold delay during the delay stopping phase above the value of the maximum delay, provided that the maximum stopping distance is observed.

According to an advantageous development of the invention, the delay increases with an increase jolt during the delay increase phase, which is chosen between a minimum increase jolt and a maximum increase jolt, wherein the minimum increase jolt is preferably between 0.4 and 0.5 m/s$^3$, and the maximum increase jolt is between 0.7 and 0.8 m/s$^3$.

According to an advantageous development of the invention, the delay decreases during the delay decrease phase with a delay jolt that is chosen between a minimum decrease jolt and a maximum decrease jolt, wherein the minimum decrease jolt is preferably between −0.4 and −0.5 m/s$^3$, and the maximum decrease jolt is between −0.7 and −0.8 m/s$^3$.

A preferred emergency stopping method for a starting speed, which is below the threshold speed mentioned above, at which the maximum stopping distance is exceeded despite the choice of the respective maximum values for jolts and threshold acceleration, is characterized by the following features:

1. With a starting speed below a lower threshold speed, the minimum delay is determined as the threshold delay and the duration of the delay stopping phase is determined as the function of the starting speed, wherein the stopping duration can fall below the minimum stopping duration. The lower threshold speed is in the region of about 10 km/h. In this lowermost speed region, it makes little sense to keep the delay to low that the minimum stopping distance of 10 s, in particular, is observed, because here the delay would turn out so low that the driver possibly does not notice the activation of the emergency stopping method. For this region of a very low speed, the jolt values can be increased, in order to perceptibly form the braking process for the vehicle driver, and/or the duration of the delay stopping phase can be reduced, so the standstill is reached several seconds before the end of the minimum stopping duration. In this case, the threshold delay is, for example, 0.75 m/s$^2$.

2. With a starting speed above the lower threshold speed and below an average threshold speed, the threshold delay is determined as a function of the starting speed in such a way that the minimum stopping duration is not fallen below. In this lower speed region, the settable variable is the delay threshold, which is chosen in such a way that the braking process is also concluded with the minimum stopping duration, i.e., the standstill is reached. The maximum stopping distance is nowhere near being reached.

3. With a starting speed above the average threshold speed and below the upper threshold speed, the threshold delay during the delay stopping phase corresponds to the maximum delay, and the duration of the delay stopping phase is determined as a function of the starting speed. In this upper speed region, the jolt values preferably correspond to the maximum values (e.g. +/−0.75 m/s$^3$) and the settable variable is the length of the delay stopping phase. The vehicle thus stops later than the minimum stopping duration. Upon reaching the upper threshold speed, in this case the maximum stopping path is achieved exactly.

4. With a starting speed above the upper threshold speed, when observing the maximum values for the jolt values and the threshold delay, the maximum stopping distance can no longer be observed. Thus, in this speed region, the threshold delay is increased beyond the predetermined maximum delay (in particular to about 2 to 3 m/s$^2$) and/or the increase jolt and/or the decrease jolt is set above the respective maximum value. These jolt or threshold delay values are determined as a function of the starting speed in such a way that the maximum stopping distance is not exceeded.

According to an advantageous development of the invention, the increase jolt and the decrease jolt are thus not constant, but rather they are chosen as a function of the starting speed. The values can be the same according to the amount or also chosen to be differently sized. The jolt values also do not have to be constant during the delay increase phase and the delay decrease phase (delay profile as first degree polynomial) but can assume other curve courses, in particular approximate a sinusoidal curve.

According to an advantageous development of the invention, after triggering the emergency stopping method, first a roll phase is carried out before the delay increase phase, in which a drive torque of the drive device of the motor vehicle is set to zero and optionally a braking actuation is carried out solely for the purpose of preventing a vehicle acceleration due to external forces, for example with a steep road or with a tailwind. In doing so, the driver is granted time to react to a warning before the vehicle is automatically delayed.

The delay increase phase follows on directly from this roll phase. Preferably, the duration of the roll phase is about 0.5 s to 1.5 s. The duration of the roll phase can be calculated into the minimum stopping duration, such that the available minimum braking duration is correspondingly shortened. When the vehicle is on a horizontal or inclining ground, no braking actuation has to be carried out during the rolling phase. In contrast, when the vehicle is on a steep road, a braking intervention is carried out if and when the speed does not further increase during the roll phase.

If the vehicle has come to a standstill, a parking brake is engaged in an advantageous development, so that the vehicle does not unintentionally (for example on an uneven location) start moving again of its own accord due to the downhill slope.

Exemplary embodiments also include a device for carrying out one of the implementations of the emergency stopping method described above, which can be connected to a sensor for recording the vehicle speed and to a control device for a drive device of the motor vehicle and to a control device for a braking system.

According to an advantageous development of this design, the device comprises a switch for manually triggering and/or ending an emergency stopping method or a driver sensor system, by means of which it can be ascertained as to whether the vehicle driver again possesses control of the vehicle. In this way, the driver can reassume control of the vehicle at any time and switch off the emergency stopping method.

The emergency stopping method is advantageously introduced automatically, for example when an expected driver reaction does not occur (e.g., the driver does not react to a warning such as a takeover request or a "hands-off warning") or when the driver is not ready or capable to assume the vehicle guiding (e.g., in the event of fainting or a heart attack). Yet, the emergency stopping method can also be introduced manually by the driver or by an occupant by operating the emergency stop switch. Thus, a front seat passenger and/or other passenger can also immediately bring the vehicle to a standstill automatically in emergency situations when the driver suddenly loses control of the vehicle.

According to a further preferred development, falling below the minimum stopping duration or exceeding the maximum stopping distance is permitted by the system when it recognizes that observing these boundary conditions would lead to the vehicle stopping at a critical location (e.g., at a crossroads). For this, the device can be connected to a navigation system, by means of which the stopping location can be determined at the start of the emergency stopping process.

Further advantages, features and details emerge from the description below, in which an exemplary embodiment is described in detail with reference to the drawings. Identical, similar or functionally identical parts are provided with the same reference numerals.

BRIEF DESCRIPTION OF THE DRAWING FIGURES

Figure 2:
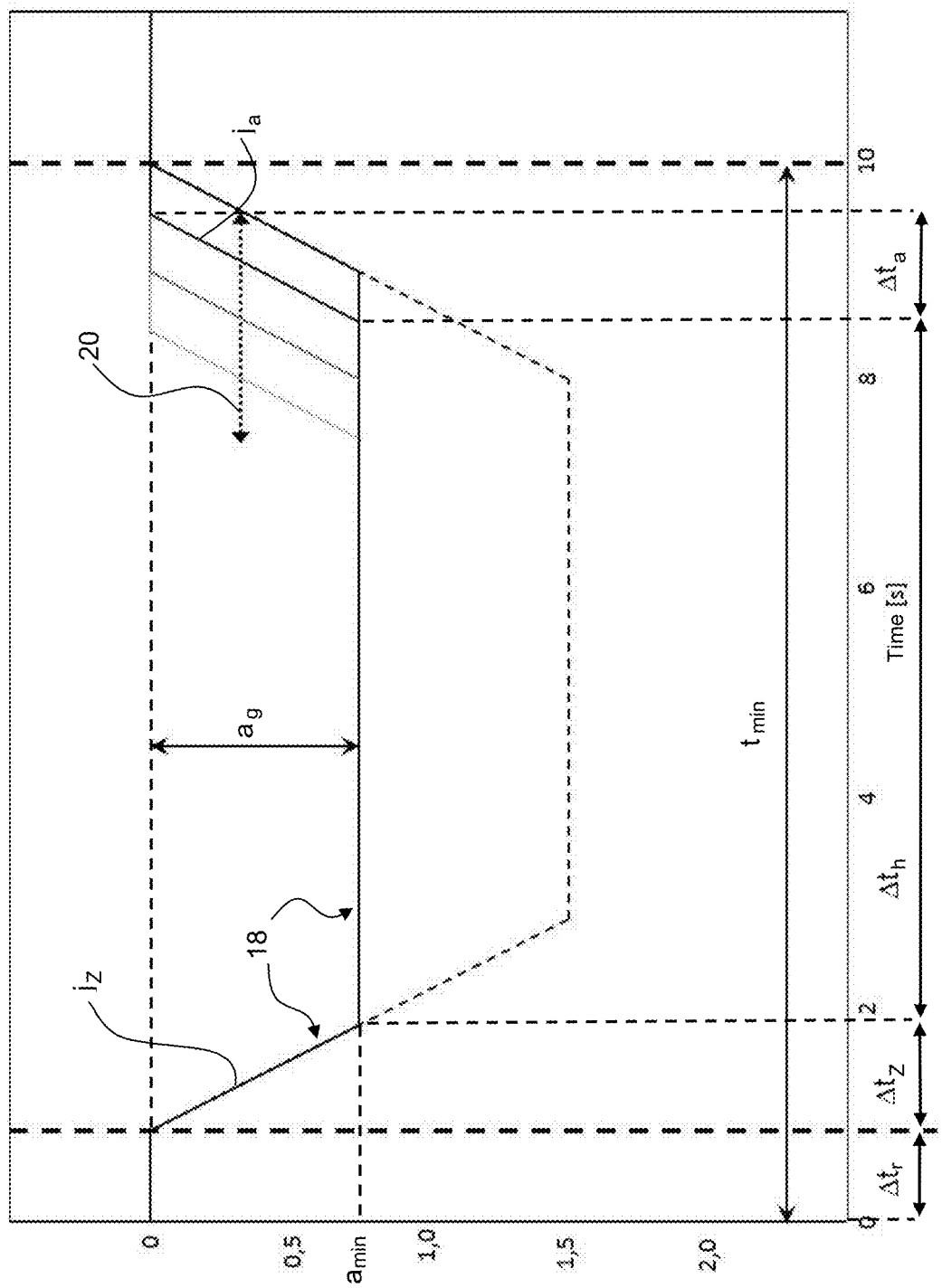
Figure 3:
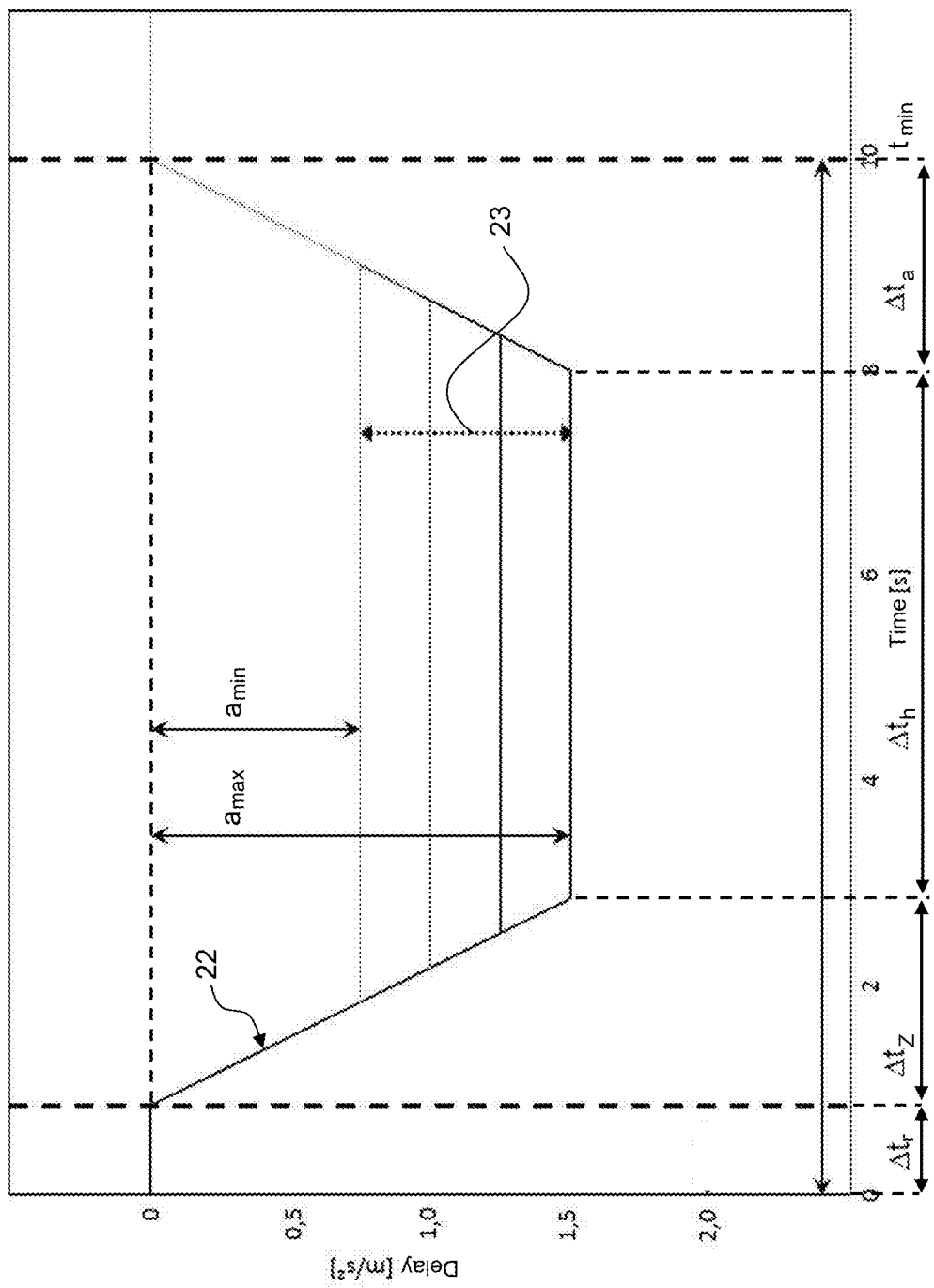
Figure 4:
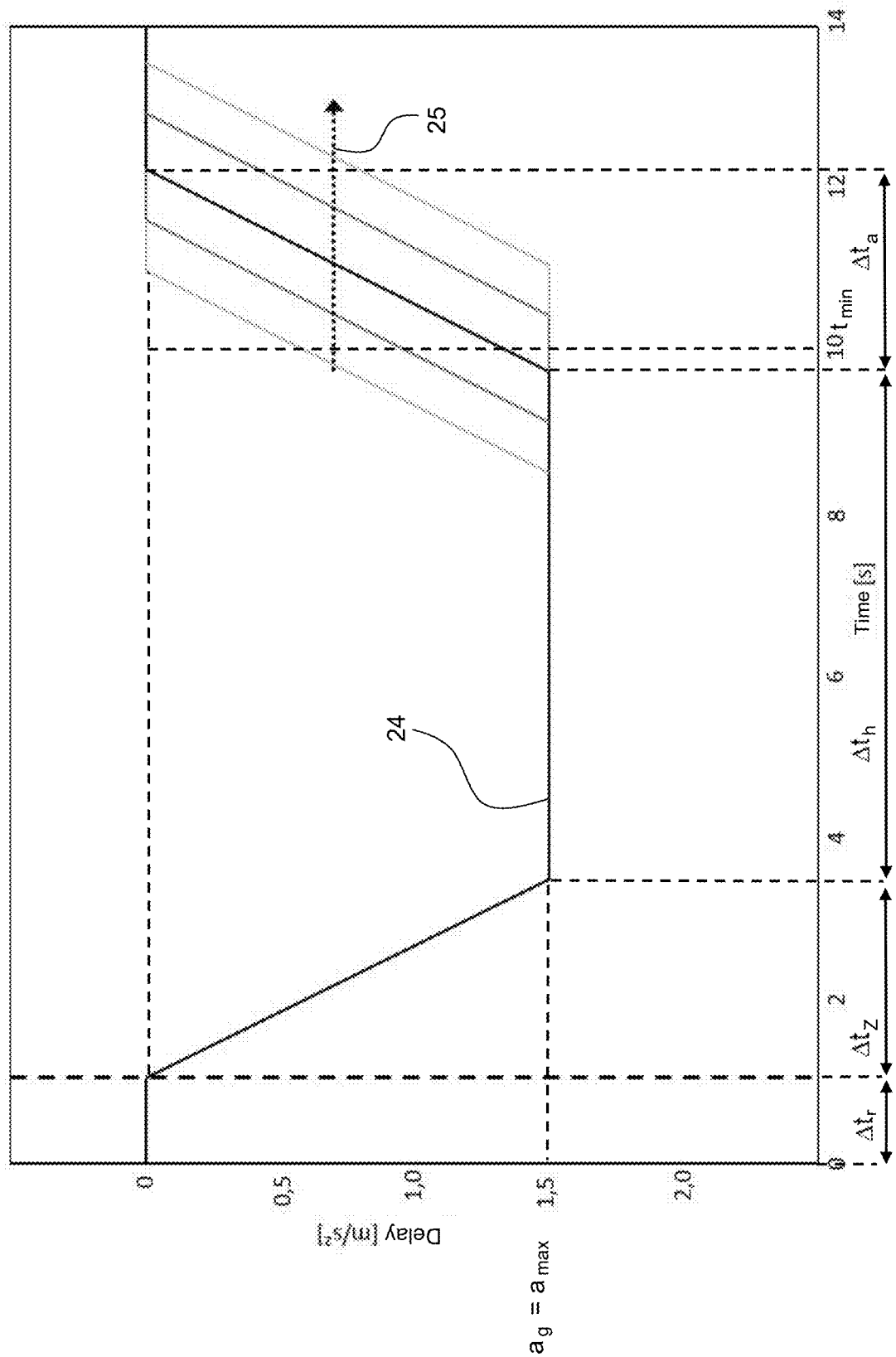
Figure 5:
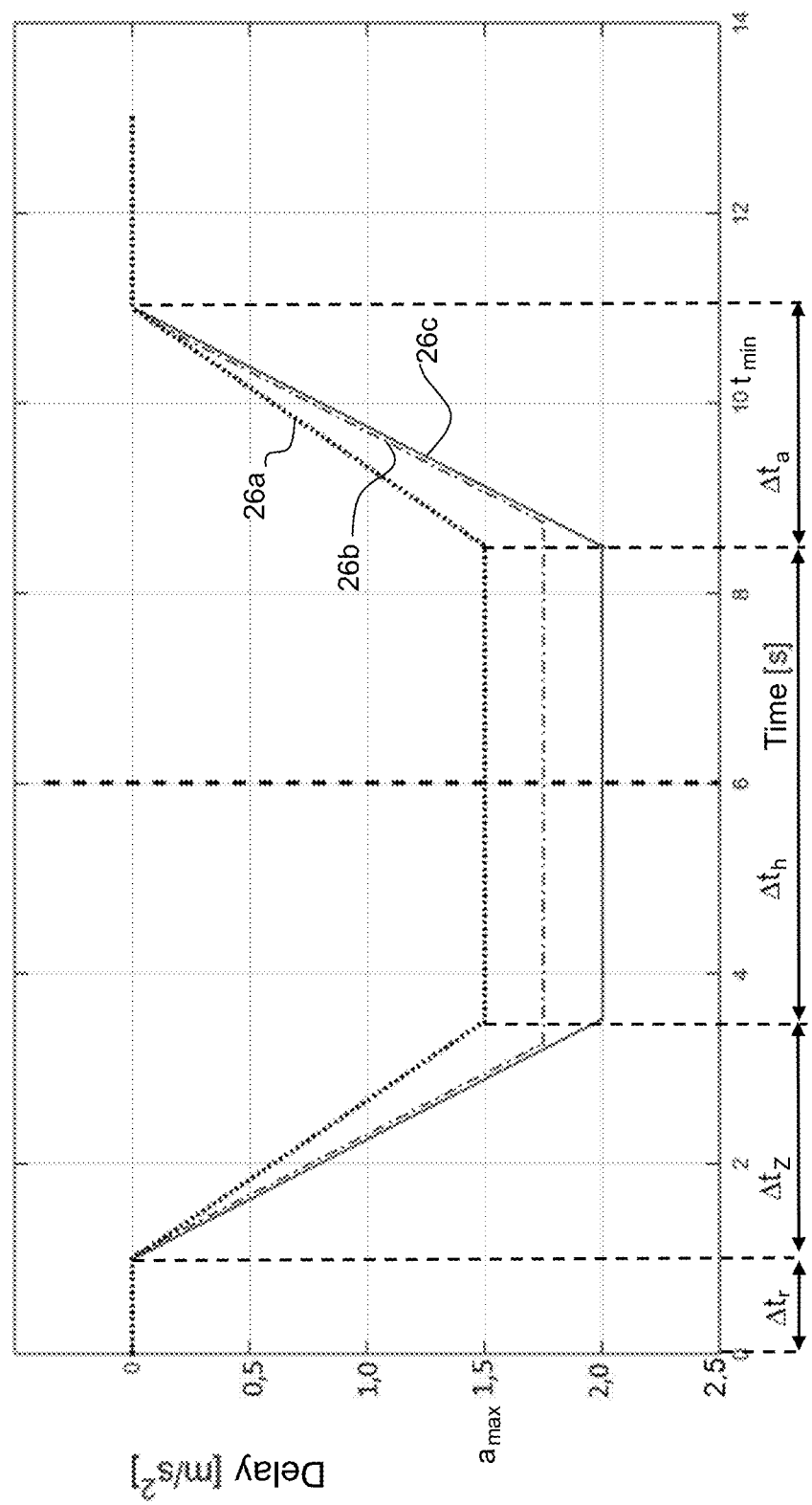
Figure 6:
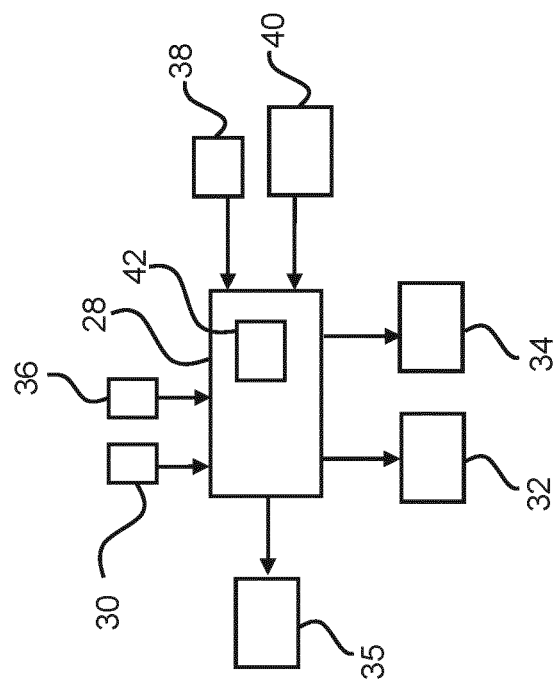

Here are shown:

FIG. 1: a delay time diagram of a delay profile with an emergency stopping method according to the invention;

FIG. 2: a delay time diagram of a delay profile with a very low starting speed;

FIG. 3: a delay time diagram of a delay profile with a low starting speed;

FIG. 4: a delay time diagram of a delay profile with an average starting speed;

FIG. 5: a delay time diagram of a delay profile with a high starting speed;

FIG. 6: a block wiring diagram of a device for carrying out the emergency stopping method according to the invention.

DETAILED DESCRIPTION

FIG. 1 shows a delay time diagram of a delay profile with an emergency stopping method according to the invention. The x-axis is the time in seconds, the y-axis the delay in [m/s$^2$]. The roll phase $\Delta t_r$ is depicted on the very left on the time axis, which various time durations $\Delta t_{z1}$, $\Delta t_{z2}$, $\Delta t_{z3}$, $\Delta t_{z4}$ follow for the delay increase phase for different delay profiles.

In the delay profile 10 (dot-dashed line), a constant increase of the delay is carried out starting from 0 up to the value of the minimum delay $a_{min}$ of 0.75 m/s$^2$. The value of the increase jolt $j_{z1}$ is 0.75 m/s$^2$/6 s, so $j_{z1}$=0.125 m/s$^3$. In this delay profile 10 for very low starting speeds $v_0$, the delay increase phase $\Delta t_{z1}$ follows a similarly long delay decrease phase $\Delta t_{a1}$ with the same size decrease jolt $j_{a1}$ according to the amount. This entire duration of the braking process emerges from the sum of the phases $\Delta t_r$+$\Delta t_{z1}$+$\Delta t_{a1}$ and, in the example depicted, result in 11 s. The allocated starting speed $v_{01}$ can be understood as the surface between the acceleration zero line 11 and the two lines $j_{z1}$ and $j_{a1}$, i.e., the surface of the triangle formed thereby.

In the delay profile 12 (dotted line), after the end of the roll phase $\Delta t_r$, a constant increase of the delay is carried out starting from 0 up to a delay value $a_2$ of about 1.1 m/s$^2$. The value of the increase jolt $j_{z2}$ is about 1.1 m/s$^2$/5.3 s, so $j_{z2}$=0.21 m/s$^3$. In this delay profile 12 for somewhat higher starting speeds $v_{02}$, a delay stopping phase $\Delta t_{h2}$ follows the delay increase phase $\Delta t_{z2}$, the delay stopping phase following a delay decrease phase $\Delta t_{a2}$. The entire duration of the braking process emerges from the sum of the phases $\Delta t_r$+$\Delta t_{z2}$+$\Delta t_{a2}$ and once again results in 11 s. The allocated starting speed $v_{02}$ can be defined as the surface between the acceleration zero line and the trapezium spanned by the three lines $j_{z2}$, $a_2$ and $j_{a2}$.

In order to achieve a deceleration duration of 11 s, the jolt with the delay increase and decrease $j_{z2}$ and $j_{a2}$ can thus be increased, whereby the delay stopping phase $\Delta t_{h2}$ emerges.

With an even higher starting speed, in the delay profile 14 (dashed line), the jolt is increased further still, and since the delay is not to exceed the maximum delay $a_{max}$, a widening of the delay stopping phase $\Delta t_h$ emerges automatically. For the delay profile 16 (solid line), the same applies for an even higher starting speed.

In FIG. 2, an alternative delay profile 18 (with a solid line) is depicted for very low starting speeds that are below a lower threshold speed $v_1$. In contrast to the delay profiles 10, 12, 14, 16 of FIG. 1, the delay profile 18 starts from constant increase jolt values $j_z$ and decrease jolt values $j_a$, which can be depicted by lines with constant inclination.

Based on the principle that the threshold delay $a_g$ is not supposed to be smaller than the predetermined minimum delay $a_{min}$, over time the delay profile 18 causes too great a deceleration of the vehicle in an integrated manner, such that this would come to a sudden standstill. Thus, the delay stopping phase $\Delta t_h$ is shortened to the extent that a gentle ending of the deceleration process is achieved in the delay decrease phase $\Delta_{ta}$, even if this happens before the minimum stopping duration $t_{min}$ (at about 10 s in the depicted example). The lower the starting speed, the more the delay stopping phase $\Delta t_h$ is shortened, and thus the delay decrease phase $\Delta t_a$ moves in the direction labelled with 20.

In FIG. 3, a delay profile 22 is depicted for a range of low starting speeds that are higher than the threshold speed $v_1$, at which the minimum stopping duration $t_{min}$ is just achieved. Here, the threshold delay $a_g$ is now determined as a function of the starting speed, wherein the threshold delay $a_g$ increases with increasing starting speed. With an average starting speed $v_2$, the threshold delay $a_g$ reaches the maximum delay $a_{max}$, wherein, in the entire speed range between $v_1$ and $v_2$, the minimum stopping duration $t_{min}$ is constantly achieved (i.e., the vehicle is decelerated to a standstill exactly within this time period), wherein the threshold delay $a_g$ changes in the region labelled with the reference numeral 23.

In FIG. 4, a delay profile 24 is depicted for a range of average starting speeds that are higher than the threshold speed $v_2$ at which the vehicle is brought to a standstill upon reaching the minimum stopping duration $t_{min}$. With higher starting speeds $v_0 > v_2$, a longer stopping duration is necessary in order to bring the vehicle to a standstill, wherein the braking distance gets longer. Here, the delay stopping phase $\Delta t_h$ is correspondingly lengthened as a function of the starting speed, which is indicated by the arrow 25. The delay profile 24 is delimited by an upper threshold speed $v_3$, at which the braking distance reaches the maximum stopping distance $s_{max}$.

In FIG. 5, several delay profiles 26a, 26b, 26c are depicted for a range of high starting speeds $v_0$ that are higher than the threshold speed $v_3$, at which the braking distance reaches the maximum stopping distance $s_{max}$. This maximum stopping distance $s_{max}$ is not to be exceeded, such that by now greater threshold delays have to be used, which exceed the maximum delay $a_{max}$. In addition, it is expedient to also increase the jolt values in the delay increase phase $\Delta t_z$ and the delay decrease phase $\Delta t_a$, as depicted in the delay profiles 26b, 26c.

In the following Table 1, the emerging values for the roll phase $\Delta t_r$, the delay increase phase $\Delta t_z$, the increase jolt $j_z$, the delay stopping phase $\Delta t_h$, the threshold delay $a_g$, the delay decrease phase $\Delta t_a$, the decrease jolt $j_a$, the total duration of the braking process $t_b = \Delta t_r + \Delta t_z + \Delta t_h + \Delta t_a$ and the emerging braking distance s are depicted in a table for various starting speeds $v_0$.

TABLE 1

| $V_0$ [km/h] | $\Delta t_r$ [s] | $\Delta t_z$ [s] | $j_z$ [m/s³] | $\Delta t_h$ [s] | $a_g$ [m/s²] | $\Delta t_a$ [s] | $j_a$ [m/s³] | $t_b$ [s] | s [m] |
|---|---|---|---|---|---|---|---|---|---|
| 10 | 1 | 1.3 | 0.60 | 2.5 | 0.75 | 1.3 | 0.60 | 6.0 | 10 |
| 30 | 1 | 1.7 | 0.60 | 6.7 | 1.00 | 1.7 | 0.60 | 11.0 | 50 |
| 80 | 1 | 2.5 | 0.60 | 12.3 | 1.50 | 2.5 | 0.60 | 18.3 | 215 |
| 120 | 1 | 2.5 | 0.60 | 19.7 | 1.50 | 2.5 | 0.60 | 25.7 | 445 |
| 140 | 1 | 3.3 | 0.60 | 16.1 | 2.00 | 3.3 | 0.60 | 23.8 | 482 |

In the following Table 2, two different delay profiles are depicted in comparison for the same starting speeds $v_0 = 30$ km/h, that is in the upper row, a delay profile with greater jolt vales $j_z$, $j_a$ and a lower threshold delay $a_g$.

TABLE 2

| $V_0$ [km/h] | $\Delta t_r$ [s] | $\Delta t_z$ [s] | $j_z$ [m/s³] | $\Delta t_h$ [s] | $a_g$ [m/s²] | $\Delta t_a$ [s] | $j_a$ [m/s³] | $t_b$ [s] | s [m] |
|---|---|---|---|---|---|---|---|---|---|
| 30 | 1 | 1.7 | 0.60 | 6.7 | 1.0 | 1.7 | 0.60 | 11.0 | 50 |
| 30 | 1 | 4.4 | 0.34 | 1.1 | 1.5 | 4.4 | 0.34 | 11.0 | 46 |

In the following Table 3, values for the threshold speeds $v_1$, $v_2$, $v_3$ and the corresponding parameters are depicted in three rows.

TABLE 3

| $V_0$ [km/h] | $\Delta t_r$ [s] | $\Delta t_z$ [s] | $j_z$ [m/s³] | $\Delta t_h$ [s] | $a_g$ [m/s²] | $\Delta t_a$ [s] | $j_a$ [m/s³] | $t_b$ [s] | s [m] |
|---|---|---|---|---|---|---|---|---|---|
| 23.6 | 1 | 1.3 | 0.60 | 1.3 | 0.75 | 1.3 | 0.60 | 11.0 | 39 |
| 40.5 | 1 | 2.5 | 0.60 | 5.0 | 1.5 | 2.5 | 0.60 | 11.0 | 68 |
| 120.0 | 1 | 2.5 | 0.60 | 19.7 | 1.5 | 2.5 | 0.60 | 25.7 | 445 |

FIG. 6 illustrates a device 28 for carrying out the method, the device being connected to a vehicle speed sensor 30 for recording the starting speed $v_0$. The device 28 has an output for controlling a control device 32 for a drive device of the motor vehicle, in order to set the drive device without torque. The device 28 has a further output for controlling a control device 34 for a braking system and an output for controlling a control device 35 for a setting braking system. Thus, the braking system is controlled according to the method according to the invention. The essential delay values can be obtained either by differentiation of the speed values of the sensor 30 or the device 28 can be connected to a separate acceleration sensor 36.

The device 28 is further connected to a switch 38 for manually triggering and/or ending the emergency stopping method and can be connected to a driver sensor system device 40. The emergency stop method according to the invention can be activated both by means of the switch 38 and by the driver sensor system device 40, wherein the current starting speed $v_0$ is measured at this moment by the speed sensor 30 and is compared with the values for the threshold speeds $v_1$, $v_2$, $v_3$ stored in a calculation unit 42 of the device 28. From this, the calculation unit 42 calculates the corresponding delay profile depending on the starting speed $v_0$ ascertained and correspondingly controls the control device 34 for the braking system, wherein the emerging acceleration values are ascertained by the acceleration sensor 36. It is alternatively also possible to use a look-up table with pre-saved values instead of the calculation unit 42.

Although the invention has been illustrated and explained in more detail by preferred exemplary embodiments, the invention is not limited by the disclosed examples, and other variations can be derived from this by the person skilled in the art without leaving the scope of protection of the invention. It is thus clear that a plurality of variation possibilities exist. It is also clear that embodiments mentioned by way of example really only constitute examples, which are not to be understood in any other way than limiting the scope of protection, for example, the application possibilities or the configuration of the invention. Instead, the description above and the description of the figures put the person skilled in the art in a position to concretely implement the exemplary embodiments, wherein the person skilled in the art, with an understanding of the disclosed idea of the invention, can undertake various amendments, for example with regard to the function or the arrangement of individual elements mentioned in an exemplary embodiment without leaving the scope of protection which is defined by the claims and the legal equivalences, such as further explanations in the description, for example.

The invention claimed is:

1. A method for automatically emergency stopping a motor vehicle from a starting speed to a standstill by a braking device of the motor vehicle, the method comprising:
   determining that the vehicle should be automatically stopped; and
   actuating, responsive to the determination that the vehicle should be automatically stopped, the braking device to carry out a delay profile having at least two delay phases, wherein, during a delay increase phase, a first delay until a threshold delay is increased and during a delay decrease phase a second delay is reduced to zero, wherein temporal courses of the delay are determined during the delay increase and the delay decrease at least sectionally as nth degree polynomials, where n>0, depending on a starting speed of the vehicle in such a way that a stopping duration, which represents a time duration necessary for emergency stopping, does not fall below a predetermined minimum stopping duration and a distance covered during the stopping duration does not exceed a predetermined maximum stopping distance.

2. The emergency stopping method of claim 1, wherein a delay stopping phase is run through between the delay increase phase and the delay decrease phase, wherein in the delay stopping phase the delay does not deviate from the threshold delay by more than a predetermined value.

3. The emergency stopping method of claim 1, the threshold delay is a function of the starting speed and exceeds a predetermined minimum delay.

4. The emergency stopping method of claim 1, wherein the first delay during the delay increase phase increases with an increase jolt, which is selected between a minimum increase jolt and a maximum increase jolt, and wherein the minimum increase jolt is between 0.4 and 0.5 m/s$^3$, and the maximum increase jolt is between 0.7 and 0.8 m/s$^3$.

5. The emergency stopping method of claim 1, wherein the second delay during the delay decrease phase decreases with a decrease jolt, which is selected between a minimum decrease jolt and a maximum decrease jolt, wherein the minimum decrease jolt is between −0.4 and 0.5 m/s$^3$, and the maximum decrease jolt is between −0.7 and −0.8 m/s$^3$.

6. The emergency stopping method of claim 5, wherein
the increase jolt and the decrease jolt are chosen to be constant when the starting speed is below an upper threshold speed,
the minimum delay is determined as the threshold delay and the duration of the delay stopping phase as a function of the starting speed when the starting speed is below a lower threshold speed, wherein the stopping duration is allowed to fall below the predetermined minimum stopping duration,
the threshold delay is determined as a function of the starting speed in such a way that the minimum stopping duration is not fallen below when the starting speed is above the lower threshold speed and below an average threshold speed,
the threshold delay during the delay stopping phase corresponds to a maximum delay and the duration of the delay stopping phase is determined as the function of the starting speed when the starting speed is above the average threshold speed and below the upper threshold speed.

7. The emergency stopping method of claim 6, wherein when the starting speed is above the upper threshold speed, the threshold delay, the maximum delay, or the increase jolt and the decrease jolt exceed respective maximum values, which are determined as a function of the starting speed in such a way that the maximum stopping distance is not exceeded.

8. The emergency stopping method of claim 7, wherein the increase jolt and the decrease jolt are selected as a function of the starting speed.

9. The emergency stopping method of claim 1, wherein after triggering the emergency stopping method, a roll phase is performed before the delay increase phase, wherein in the roll phase a drive torque of a drive device of the motor vehicle is set to zero and a braking actuation is performed with to prevent a vehicle acceleration caused by externally acting forces.

10. A device for automatically emergency stopping a motor vehicle from a starting speed to a standstill by a braking device of the motor vehicle, wherein the device is configured to:
actuate the braking device to carry out a delay profile having at least two delay phases,
wherein, during a delay increase phase, a first delay until a threshold delay is increased and during a delay decrease phase a second delay is reduced to zero,
wherein temporal courses of the delay are determined during the delay increase and the delay decrease at least sectionally as nth degree polynomials, where n>0, depending on a starting speed of the vehicle in such a way that a stopping duration, which represents a time duration necessary for emergency stopping, does not fall below a predetermined minimum stopping duration and a distance covered during the stopping duration does not exceed a predetermined maximum stopping distance,
wherein the device is connected to a sensor that records the driving speed and to a control device for a drive device of the motor vehicle, and to a control device for a braking system.

* * * * *